United States Patent
Johansson et al.

(10) Patent No.: US 10,552,249 B1
(45) Date of Patent: Feb. 4, 2020

(54) SYSTEM FOR DETERMINING ERRORS ASSOCIATED WITH DEVICES

(71) Applicant: AMAZON TECHNOLOGIES, INC., Seattle, WA (US)

(72) Inventors: Jesper Mikael Johansson, Redmond, WA (US); Darren Ernest Canavor, Redmond, WA (US); Varadarajan Gopalakrishnan, Cupertino, CA (US); Kevin Michael Small, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 107 days.

(21) Appl. No.: 15/157,036

(22) Filed: May 17, 2016

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0709* (2013.01); *G06F 11/0751* (2013.01)

(58) Field of Classification Search
CPC ............... G06F 11/0793; G06F 11/079; G06F 11/0709; G06F 11/0751
USPC ......................................................... 714/25
See application file for complete search history.

(56) References Cited

U.S. PATENT DOCUMENTS

| | | | |
|---|---|---|---|
| 7,020,598 B1 * | 3/2006 | Jacobson | G06F 11/2294 702/57 |
| 9,953,088 B2 * | 4/2018 | Gruber | G06F 16/9535 |
| 2004/0010488 A1 * | 1/2004 | Chaudhuri | G06F 16/2462 |
| 2004/0012808 A1 * | 1/2004 | Payne | G06F 11/0733 358/1.15 |
| 2004/0049405 A1 * | 3/2004 | Buerger | G06Q 30/02 455/466 |
| 2004/0153823 A1 * | 8/2004 | Ansari | G06F 11/0715 714/38.14 |
| 2006/0229896 A1 * | 10/2006 | Rosen | G06Q 10/10 705/321 |
| 2010/0057657 A1 * | 3/2010 | Boothe | G06N 5/04 706/46 |
| 2012/0030346 A1 * | 2/2012 | Fukuda | G06F 11/0709 709/224 |
| 2012/0136961 A1 * | 5/2012 | Chen | H05B 37/0245 709/217 |

* cited by examiner

*Primary Examiner* — Yair Leibovich
(74) *Attorney, Agent, or Firm* — Lindauer Law, PLLC

(57) ABSTRACT

Described are techniques for determining occurrence of an error within a system of related devices. If the device affected by the error is not known, other devices within the system may be used to determine whether a device is unresponsive, non-functional, or limited in functionality. The other devices may also be used to determine data indicative of characteristics of the error, such as statuses and activities of devices at or near the time of the error, which may be used to generate a query. The query may be used to determine possible control actions that may address the error or prevent subsequent errors.

20 Claims, 7 Drawing Sheets

SYSTEM FOR DETERMINING ERRORS ASSOCIATED WITH DEVICES

BACKGROUND

When errors associated with particular devices occur, accessible information regarding the error may be limited, such as when the device affected by the error lacks suitable output devices or communication interfaces to provide this information.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
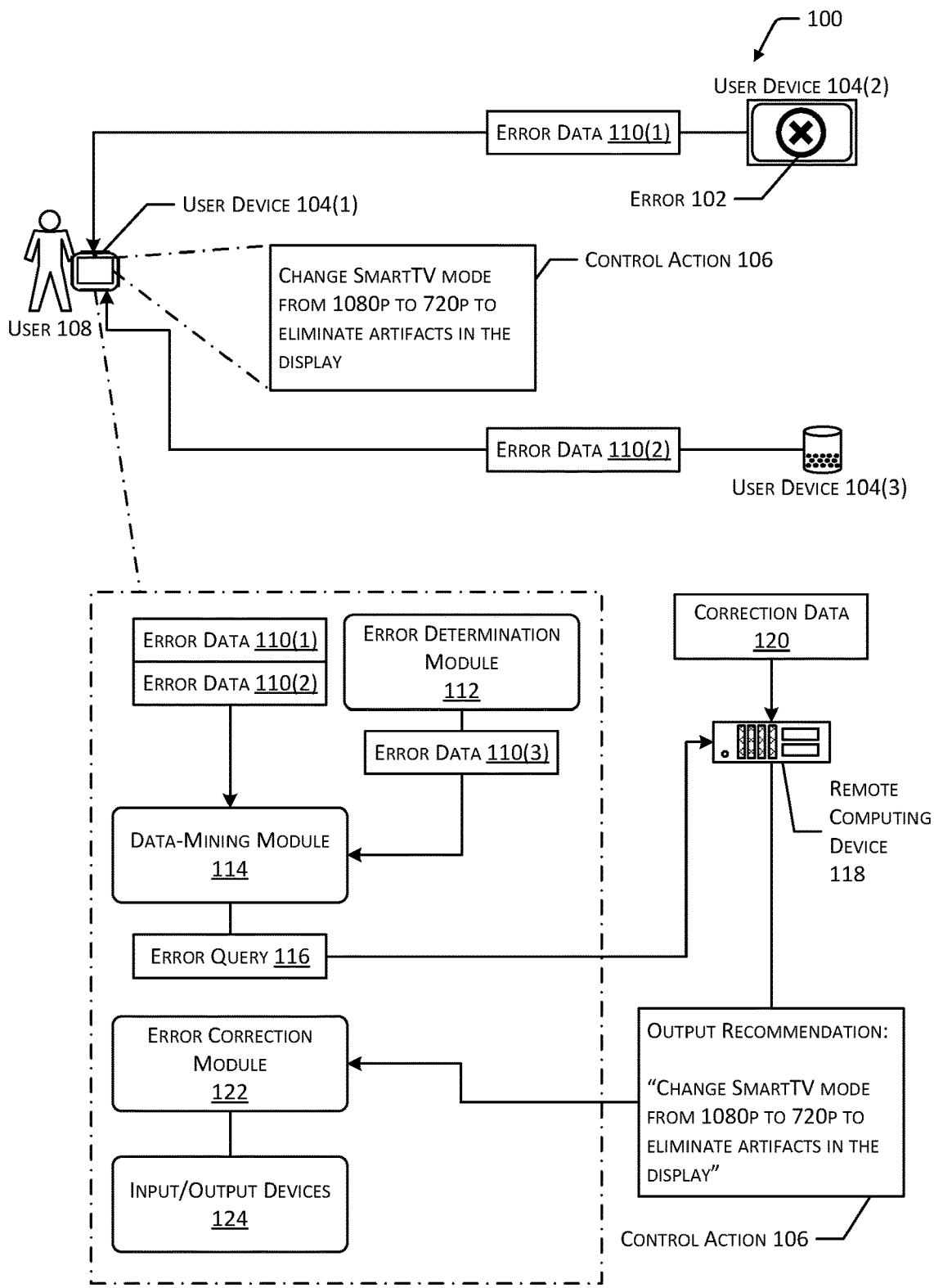
FIG. 1 depicts a system for determining the occurrence of errors associated with one or more user devices, and suitable control actions to address the errors.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When an environment includes multiple devices, some of which may be in networked communication with one another, identification of an error affecting a particular device may be difficult. For example, a home or business may include a wireless network which is accessed by multiple computing devices, such as routers, desktop, laptop, or tablet computers, smartphones, smart televisions, and various computing accessories, such as printers, scanners, and so forth. The network may also be used to communicate with other types of devices that lack traditional processors or other computing components, such as appliances, lights, speakers, and so forth, which may be controllable using a networked computing device. For example, in some environments, a tablet computer may be used to control the luminosity of a light fixture, the volume of one or more speakers, the temperature of a refrigerator, one or more settings of a washing machine or air conditioner, and so forth. An environment may also include one or more devices not associated with a network. For example, a television, computer, speaker, light fixture, or appliance may be present in an environment but may not necessarily communicate with other devices via the network.

When one particular device in an environment experiences an error, occurrence of the error may not be apparent, or the particular device affected by the error may not be evident. For example, if a computing device is unable to access the Internet using a Wi-Fi network, this error may not be determined until a user or another device attempts to access the computing device or to access the Internet using the computing device. Additionally, once this error is determined, it may not be evident whether this error is associated with the computing device itself, with an access point associated with the network, or with one or more other components in the environment. As another example, an error may affect a device that lacks display or audio output devices or that lacks a user interface, which may hinder the ability to determine that an error has occurred or to determine additional information regarding the error.

Described in this disclosure are techniques for determining the occurrence of an error affecting a device, and possible control actions to take responsive to the error, using other devices in the environment. In some implementations, an error associated with a particular device may be determined based on user input. For example, a user may activate a control, such as a button or switch, positioned on a device, to indicate that the device is not functioning properly. As another example, a user may provide an error report or a similar indication of the error using a user interface associated with the affected device, or with another device in the environment.

In other implementations, an error associated with a device may be determined in the absence of user input. For example, when a first device attempts to access a second device or perform a function that requires use of the second device, and the attempt fails, this incident may indicate the presence of an error. As another example, one or more devices may periodically provide signals (e.g., "pings") to other devices to determine the status thereof, or devices may periodically provide signals (e.g., "heartbeats") indicating their status. The absence of an expected signal or the presence of an unexpected signal may indicate an error. In still other implementations, a device affected by an error may generate an indication of the error, such as an error log, and provide this indication to one or more other devices automatically or responsive to a request.

In some cases, an error associated with a device that is not in networked communication with other devices may be detected using one or more sensors of a networked device. For example, a display output of a television or computer or the light output from a light fixture may include a visible characteristic indicative of an error. A camera or other type of image sensor associated with a computing device in the environment may determine the presence of this error based on the visible characteristic. As another example, audio output from a speaker or sounds produced by an appliance motor or other type of device may be detected by a microphone or another type of audio sensor associated with a computing device. Based on the audio characteristic determined by the sensor, an error may be detected.

In some implementations, the particular device affected by an error may be unknown. For example, a user may activate a control, such as a button or switch associated with any of the devices in the environment, to indicate an unknown error associated with one or more devices in the environment. Responsive to this user input, one or more devices in the environment may provide signals to and receive signals from other devices indicating the status thereof. Based on these signals, the particular device(s) affected by an error may be determined. Continuing the example, a user's tablet computer may be used to stream content received from a remote source via the Internet to a smart television and an associated sound system. During output of the content, the user may notice that the audio and video content are not synchronized, but may not be aware whether the television, the sound system, the tablet computer, or the access point used to communicate via the Internet has been affected by an error. The user may press a generic "panic button" to indicate that an unknown error is affecting one or more devices in the environment. Responsive to the signal associated with the button, one or more devices may provide signals (e.g., "pings") to other devices. Devices that do not respond successfully to the signals may be determined to be affected by an error, and additional information regarding the possible error may be determined.

When an error associated with a particular device is identified, other devices in the environment may determine error data indicating characteristics of the error. In some implementations, if the device affected by the error remains functional and is configured to communicate with other devices, the erroneous device may provide an error log to one or more other devices in the environment. In other implementations, other devices in the environment may determine error data based on observable actions of the erroneous device at or near the time of the error. For example, various computing devices associated with the same Wi-Fi network as a device affected by an error may determine error data indicating the status of the network at the time of the error, devices associated with the network at the time of the error, data transmitted via the network at the time of the error, particular actions undertaken by the erroneous device at the time of the error, and so forth. In some implementations, if an error affects a device that is not in networked communication with other devices in the environment, sensors associated with a networked device may be used to determine error data. For example, a camera associated with a computing device may be used to determine visible characteristics of a display device, such as the content that was being output at the time of the error. As another example, a camera may determine the luminosity or color of a light source, whether the light source was flickering irregularly, the frequency of regular flickering, and so forth. As yet another example, a camera may determine whether an appliance was moving or vibrating and the rate of such movement, whether the appliance was emitting smoke, and so forth. In other cases, a microphone associated with a computing device may be used to determine audible characteristics of an audio device, such as the sound that was output by a speaker at the time of the error. As another example, a microphone may determine sounds emitted by the fan of a computer, the motor of an appliance, and so forth.

Based on the error data, one or more of the computing devices in the environment may generate a query including at least a subset of the determined characteristics of the error. For example, a query may indicate identifying information regarding the device experiencing the error, particular hardware, software, or parts that were used at the time of the error, and any output, sounds, or visible characteristics associated with the device at the time of the error. In some implementations, the query may be provided to a computing device external to the environment that is configured to determine correction data that corresponds to the error characteristics. The correction data may associate possible causes of the error and possible solutions with various sets of error characteristics, such that correspondence between a determined set of error characteristics and the correction data may indicate one or more possible control actions to address the error. In other implementations, correspondence between the correction data and the error data may be determined by a computing device within the environment.

Based on the control actions indicated in the correction data, one or more of the control actions may be automatically performed. In other implementations, one or more control actions may be output to a user (e.g., as a recommendation). For example, the correction data may indicate that a particular configuration of a device may have caused the error. Responsive to this indication, the control action may include automatically modifying the configuration, or providing a notification to a user indicating the particular configuration that should be modified to avoid subsequent errors. As another example, the correction data may indicate that a particular configuration of a device may lead to failure of a particular function of the device within a specific timeframe. Continuing the example, based on the frequency of use and the particular configurations of a washing machine, the correction data may indicate that the motor of the washing machine will fail within the next two weeks. The corresponding control action may include automatically ordering a replacement part, or outputting an indication of the part serial number to the user.

In some implementations, user data associated with the user of one or more devices in the environment may be used to determine particular control actions. For example, a user's account history may indicate that a user has requested technical support on numerous occasions, indicating that control actions that require a significant level of technical sophistication may be unsuitable for recommendation to the user. Continuing the example, control actions automatically performed on devices in the user's environment may include automatic requests for technical support, such as on-site personnel to install or replace parts, or remote personnel to access a computing device to modify software configurations.

FIG. 1 depicts a system 100 for determining the occurrence of errors 102 associated with one or more user devices 104, and suitable control actions 106 to address the errors 102. An environment may include multiple user devices 104 of various types. User devices 104 may include computing devices, such as mobile devices, set-top boxes, tablet computers, personal computers, wearable computers, servers, and so forth. User devices 104 may also include audio, video, olfactory, or haptic output devices, such as televisions or other display devices, speakers or other sound devices, and so forth. User devices 104 may further include devices adapted to receive input, such as signal transmitting devices used to communicate emergencies, scan or catalog items, indicate items to be purchased, and so forth. User devices 104 may additionally include appliances and equipment configured to control aspects of an environment, such as washing machines, dryers, ovens, microwaves, stoves, air conditioners, light fixtures, and so forth. Some user devices 104 may include processors, memory, or other computing components and may function as computing devices. For example, a tablet computer may be configured to perform various computing functions and exchange data with other user devices 104. Other user devices 104 may lack processing abilities but may communicate with other user devices 104. For example, a television may lack a processor but may be configured to receive signals from a tablet computer to enable the tablet computer to control the television. Still other user devices 104 may be present in an environment but may lack the ability to communicate with other user devices 104. For example, some televisions, speakers, light fixtures, or appliances may lack the capability to send or receive data to or from other user devices 104.

FIG. 1 depicts an example environment that includes a first user device 104(1), shown as a tablet computer, a second user device 104(2), shown as a smart television (TV), and a third user device 104(3), which may include one or more speakers or other elements of a sound system. The user devices 104 may send and receive data to and from one another using one or more networks, such as local area networks (LANs), wireless LANs, wide area networks (WANs), wireless WANs, and so forth. In use, the first user device 104(1) may provide signals to the second user device 104(2) and third user device 104(3) to control the other user devices 104. For example, the tablet computer may be configured to present a user interface that may be used by a user 108 to select visual or audio content to be output by the smart TV, to adjust the volume or other characteristics of the audio output, to adjust various characteristics of the display output, and so forth. Similarly, the tablet computer may be configured to select audio content for output by the speaker(s), adjust the volume or other characteristics of the audio output, and so forth. As another example, the speaker(s) may be configured to receive audio content from the smart TV or another device providing content to the smart TV to enable the speaker(s) to output the audio portion of the content while the smart TV outputs the video portion thereof. The tablet computer may be configured to receive one or more of the audio or video content from the other user devices 104 for output. For example, the tablet computer may be used to stream content from the other user devices 104 when the user 108 is not proximate to the smart TV or speaker(s). While FIG. 1 depicts three example user devices 104 in networked communication with one another, other implementations may include any number and any type of user devices 104, including one or more user devices 104 that are not configured to exchange data with other user devices 104.

When an error 102 affects one or more user devices 104 in the environment, one or more of the user devices 104 may be configured to determine occurrence of the error 102. For example, during output of content, the display of the smart TV may include one or more irregularities (e.g., "artifacts"). In some implementations, the user 108 may provide an indication of the error 102, such as by actuating a control associated with the second user device 104(2) or by providing information using a user interface associated with the second user device 104(2) or one of the other user devices 104. For example, a user 108 associated with the third user device 104(3) may access an error reporting user interface and provide data thereto. In other implementations, the second user device 104(2) may indicate occurrence of the error 102, such as by providing data or a signal to one or more other user devices 104. In still other implementations, the first user device 104(1) or third user device 104(3) may determine occurrence of the error 102, such as by providing data to or receiving data from the second user device 104(2) or by determining one or more characteristics of the network at or near the time that the error 102 occurred. For example, the second user device 104(2) may generate a signal indicative of the error 102 at or near the time that the error 102 occurred. As another example, the first user device 104(1), the third user device 104(3) or another user device 104 may determine the absence of an expected signal from the second user device 104(2) or a characteristic of the network or another user device 104 indicative of the failure of the second user device 104(2) to perform a particular function. In one implementation, sensors associated with a user device 104 may be used to determine visible or audible characteristics of the second user device 104(2) indicative of the error 102. For example, a camera or microphone associated with the tablet computer may be used to determine the presence of irregularities in the display of the smart TV or the sound produced by the speaker(s). In some implementations, the microphone associated with the tablet computer may determine characteristics of the second user device 104(2) that may not be perceptible to human users, such as sound waves having a frequency outside a range associated with human hearing. In other implementations, the camera associated with the tablet computer may determine characteristics of the second user device 104(2) that may not be perceptible to human users, such as light waves outside of a portion of the spectrum that is visible to humans.

In some implementations, the particular user device 104 affected by the error 102 may not be evident. For example, the user 108 may provide input indicative of an unknown error affecting the user's 108 experience when using the system 100. Responsive to such an indication, one or more of the user devices 104 may provide signals (e.g., "pings") to other user devices 104 to determine the status thereof. User devices 104 that do not provide a return signal within a threshold length of time may be affected by the error 102. As another example, one or more of the user devices 104 may provide signals (e.g., "heartbeats") to other user devices 104 to indicate the status thereof. User devices 104 that do not provide such a signal may be affected by the error 102.

After occurrence of an error 102 has been determined, one or more of the user devices 104 may determine error data 110 associated with the error 102. The error data 110 may indicate one or more characteristics of the error 102. For example, the error data 110 may include one or more identifiers associated with the user device 104(2) affected by the error 102. The error data 110 may include one or more identifiers indicative of the error 102, itself, such as an error code or error message. In cases where the error 102 was indicated by the user 108, the error data 110 may include user input describing characteristics of the error 102. In some implementations, the user device 104(2) affected by the error 102 may generate an error log, or other types of error data 110(1) indicative of the status or activities of the user device 104(2) at or near the time that the error 102 occurred. The other user devices 104 may also generate error data 110. For example, the third user device 104(3) may generate error data 110(2) indicative of the status of the network and the activities performed by the third user device 104(3) at or near the time that the error 102 occurred. Continuing the example, if the third user device 104(3) was receiving audio content from the same source that the second user device 104(2) was receiving video content, this information may indicate the actions undertaken by the second user device 104(2) at the time of the error 102. As another example, the first user device 104(1) may similarly generate error data 110(3) indicative of the status of the network and the activities performed by the first user device 104(1) at or near the time that the error 102 occurred.

Additionally, one or more sensors associated with the first user device 104(1) may be used to determine additional error data 110(3). For example, a camera associated with the tablet computer may be used to acquire images of the display presented by the smart TV at or near the time of the error 102.

Error data 110 may be generated or determined by an error determination module 112 associated with one or more of the user devices 104. While FIG. 1 depicts the error determination module 112 associated with the first user device 104(1), any number of user devices 104 may generate or determine error data 110. In some implementations, data from various user devices 104 may be transmitted to a user device 104 associated with the error determination module 112 for generation of the error data 110. For example, if a user device 104 lacks a processor or other computing components but is capable of determining information regarding the network or the user devices 104, this information may be provided to the error determination module 112 associated with another user device 104. In other implementations, the error determination module 112 may be associated with a server or another computing device remote from the user devices 104.

Based on the error data 110 determined using various user devices 104, a data mining module 114 may be used to generate an error query 116 configured to determine possible control actions 106 to address the error 102. While FIG. 1 depicts the data mining module 114 associated with the first user device 104(1), any number of user devices 104 may generate or determine error queries 116. In some implementations, the data mining module 114 may be associated with a server or another computing device remote from the user devices 104. The error query 116 may include data indicative of at least a portion of the error data 110. For example, the error query 116 may be configured to interrogate a database, perform a search using a search engine, or to query a data source for values identical or within a threshold tolerance of those present in the error query 116.

In some implementations, the error query 116 may be provided to a remote computing device 118 associated with correction data 120. Correction data 120 may associate particular control actions 106 with corresponding sets of error characteristics. For example, the correction data 120 may include one or more control actions 106 that correspond to a particular type of user device 104, such as a smart TV, a particular application executing at the time of the error 102, such as browser, and a particular type of error, such as visible artifacts in a display output. Continuing the example, based on the error characteristics determined from the error data 110 and indicated in the error query 116, the correction data 120 may indicate that modifying a configuration or setting relating to the display mode or resolution of the smart TV may correct the error 102.

In other implementations, the error query 116 or the error data 110, itself, may be used in conjunction with a local source of correction data 120. For example, one or more of the user devices 104 may be associated with data storage storing the correction data 120. In some cases, the correction data 120 may be stored in a database or another type of format suitable for interrogation using an error query 116. In other cases, the correction data 120 may be stored in a manner that enables correspondence with the error data 110 to be determined without necessarily generating an error query 116. For example, one or more of the user devices 104 may determine a possible control action 106 based on the error data 110 without additional interrogation of external data sources. In still other implementations, the data mining module 114 may generate multiple error queries 116 in sequence, based on the results obtained using previous error queries 116. For example, a first error query 116 may determine a particular control action 106 that may be performed responsive to an error 102. Performance of the particular control action 106 may cause additional error data 110 to be determined. Based on the additional error data 110, one or more subsequent error queries 116 may be generated and used to determine one or more additional control actions 106.

An error correction module 122 associated with one or more of the user devices 104 may cause a control action 106 to be performed or an indication of one or more control actions 106 to be output, e.g., using one or more input/output (I/O) devices 124 of a user device 104. For example, the error correction module 122 may cause one or more user devices 104 or components thereof to be reset, to modify one or more configurations of a user device 104 or component, and so forth. As another example, the error correction module 122 may cause a visible or audible output indicative of the determined control action(s) 106 to be presented to the user 108 using one or more of the user devices 104. Continuing the example, a control action 106 may include outputting the text "Change SmartTV mode from 1080p to 720p to eliminate artifacts in the display" to a display device of the tablet computer.

Figure 2:
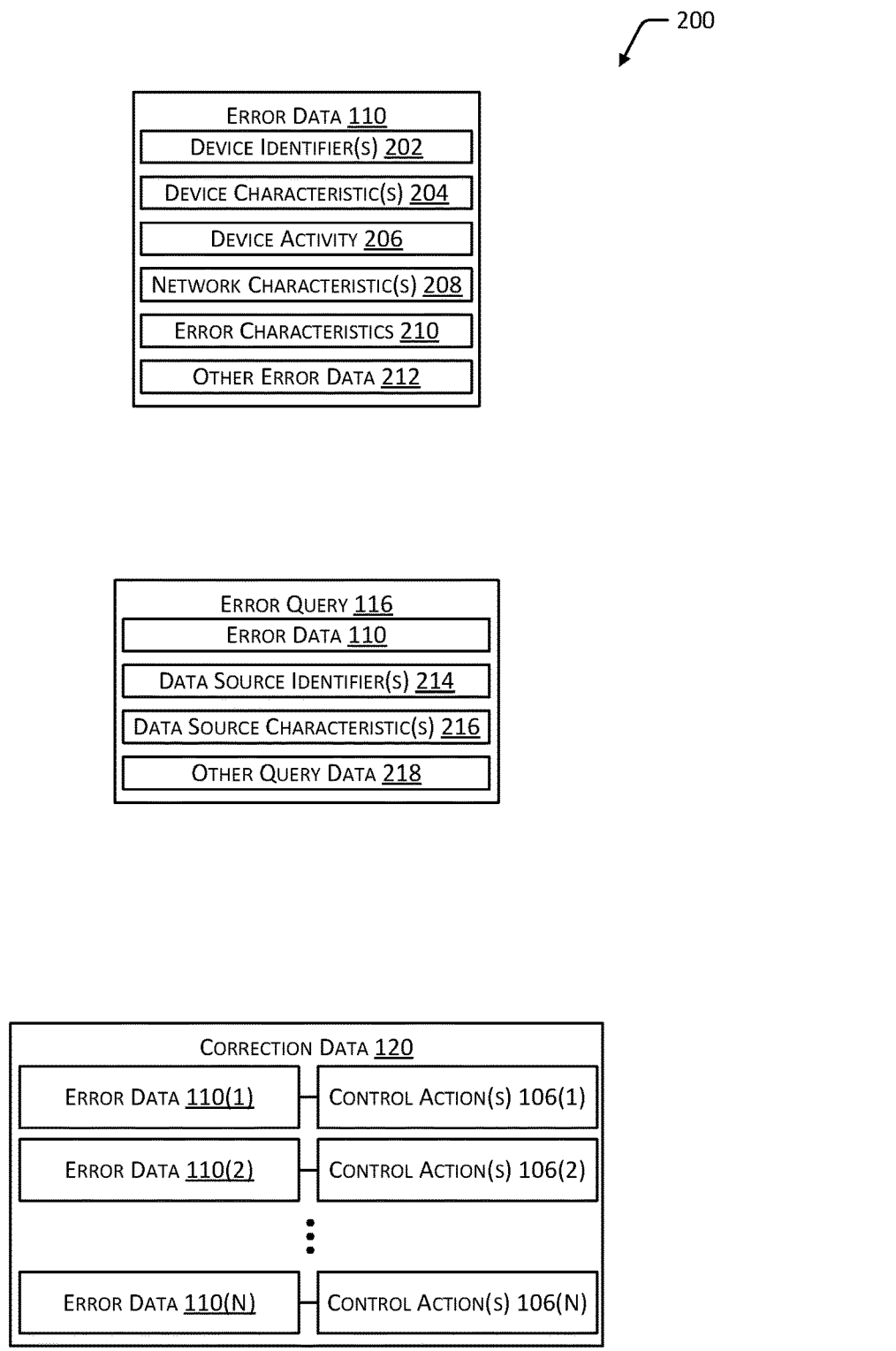
FIG. 2 depicts block diagrams illustrating example error data, error queries, and correction data.

FIG. 2 depicts block diagrams 200 illustrating example error data 110, error queries 116, and correction data 120. Error data 110 may include data indicative of one or more characteristics of an error 102, user devices 104 or components thereof associated with the error 102, other user devices 104 in the same environment as the user device(s) 104 associated with the error 102, one or more networks associated with the error 102, and so forth. The error data 110 may be used to determine potential causes of an associated error 102 or potential control actions 106 that may be performed responsive to the error 102. Error data 110 may be determined by any number and any type of user device 104 present in an environment associated with an error 102. For example, if an error 102 affects a first user device 104(1), a second user device 104(2) in networked communication with the first user device 104(1) or that is able to detect the first user device 104(1) using one or more sensors may determine error data 110 associated with the error 102. In some cases, the user device 104 affected by the error 102 may also determine error data 110, such as by generating an error log.

The error data 110 may include one or more device identifiers 202 indicative of the user device 104 affected by the error 102. Device identifiers 202 may include device names, model or serial numbers associated with the user device 104, network identifiers of the user device 104, such as internet protocol (IP) addresses or media access control (MAC) addresses, and so forth. For example, a smartphone affected by an error 102 may be identified using its MAC address. As another example, a refrigerator affected by an error 102 may be identified using its model or serial number. Device identifiers 202 may include any manner of alphanumeric data, audio data, image data, or other types of data that may be used to differentiate a particular user device 104 from other user devices 104. In some implementations, a device identifier 202 may include data that may be determined by a computing device but may not necessarily be understandable to a human user 108.

The error data 110 may also include data indicative of one or more device characteristics 204. Device characteristics 204 may include physical characteristics of a user device 104, such as dimensions of a washing machine or computer monitor. Device characteristics 204 may include components of a user device 104, such as hardware associated with a computer or parts associated with a clothes dryer. Device characteristics 204 may also include software associated with a computing device, such as applications, operating systems, modules, and so forth accessible to the computing device. In some implementations, device characteristics 204 may include version numbers, part numbers, or other identifiers associated with particular components or software.

The error data 110 may include data indicative of one or more device activities 206. Device activities 206 may include, for example, a status of a user device 104 at or near the time that an error 102 occurred, such as whether a user device 104 was connected to a network, whether the user device 104 was sending or receiving data, whether the user device 104 was in a power-saving mode, a temperature of the user device 104, the computing resources (e.g., processor cycles) used by the user device 104 at a particular time, and so forth. As another example, device activities 206 may include an indication of functions performed at or near the time of an error 102, such as a thermostat setting for an air conditioner and an indication regarding whether an air conditioner motor was active at the time of an error 102. Device activities 206 may also include an indication of software that was executed at or near the time of an error 102, data that was input to or output from a user device 104 at or near the time of the error 102, and so forth.

The error data 110 may further include data indicative of one or more network characteristics 208. Network characteristics 208 may include one or more identifiers associated with a network used by an erroneous user device 104 or other user devices 104 within an environment. Network characteristics 208 may also include an indication of a status of the network, such as whether the network was accessible to user devices 104 or whether the user devices 104 were able to access the internet using the network at a particular time. Network characteristics 208 may include indications of the capabilities of a network, a type associated with the network, hardware or software used to generate or access the network, and so forth.

The error data 110 may additionally include error characteristics 210. Error characteristics 210 may include codes or identifiers indicative of particular errors 102 or types of errors 102. Error characteristics 210 may include an indication of a function or part of a user device 104 affected by the error 102. For example, the error characteristics 210 may indicate that an error 102 has caused a user device 104 to be unable to access the internet, an error 102 has affected the display output for a user device 104, an error 102 has affected the rate at which a light fixture powered by alternating current (AC) is flickering, and so forth. In some implementations, error characteristics 210 may include visible or audible characteristics of a user device 104, which may be determined using sensors associated with other user devices 104. For example, a microphone of a user device 104 may determine audio output provided by a speaker of an erroneous user device 104 or the sounds produced by a motor of a user device 104 during operation. As another example, a camera of a user device 104 may determine visible output provided by a display of an erroneous user device 104, light emitted by a user device 104, movement or vibration of a user device 104, dimensions or color of a user device 104, and so forth.

Other error data 212 may include other characteristics of devices, structures, components, and so forth in an environment at or near the time of an error 102. Other error data 212 may also include an indication of times at which particular error data 110 was identified. For example, the time at which a particular device activity 206 occurred relative to the time that an error 102 occurred may be used to determine a possible cause of the error 102.

Error queries 116 may be generated, based at least in part on error data 110, for use in interacting with a data source that includes correction data 120. For example, error queries 116 may be configured to interrogate a database, search a data repository, or determine identical or similar values within other types of data sources. An error query 116 may therefore include at least a portion of the error data 110 determined for an error 102.

Error queries 116 may also include one or more data source identifiers 214 indicative of the device, data storage medium, data file, or other location associated with the correction data 120. For example, a data source identifier 214 may include a file name and an IP address associated with a computing device storing the correction data 120. Error queries 116 may further include indications of one or more data source characteristics 216. For example, an error query 116 may be configured based on a particular format associated with a data source or data file. Continuing the example, if the correction data 120 is stored in a particular type of database, the error query 116 may be configured to interrogate the particular type of database. Other query data 218 may include information indicative of the user 108 or user device 104 generating the error query 116, access credentials for accessing the correction data 120, user input providing additional information regarding the error 102, and so forth.

The correction data 120 may include indications of one or more control actions 106 stored in association with corresponding error data 110. For example, FIG. 2 depicts the correction data 120 including a first set of error data 110(1) stored in association with one or more first control actions 106(1) and a second set of error data 110(2) stored in association with one or more second control actions 106(2). Any number of additional control actions 106(N) may be stored in association with any number of additional sets of error data 110(N). Any number of control actions 106 may correspond to a single set of error data 110. Likewise, any number of sets of error data 110 may correspond to a single control action 106. Responsive to an error 102 one or multiple control actions 106 may be performed. For example, a set of control actions 106 may include generating output for access by a user 108 as well as modifying a configuration of a user device 104. Example control actions 106 may include, without limitation, generating visible, audible, tactile, or olfactory output, modifying a configuration associated with a user device 104 or component thereof, resetting a user device 104 or component thereof, deactivating a user device 104 or component thereof, establishing communication between user devices 104 or networks, or terminating communication between user devices 104 or networks. In some implementations, a control action 106 may include causing an action to be performed at a future time. For example, a control action 106 may include ordering a replacement part for a user device 104 at a particular future time, scheduling on-site or remote technical support from a service provider at a future time, and so forth.

Figure 3:
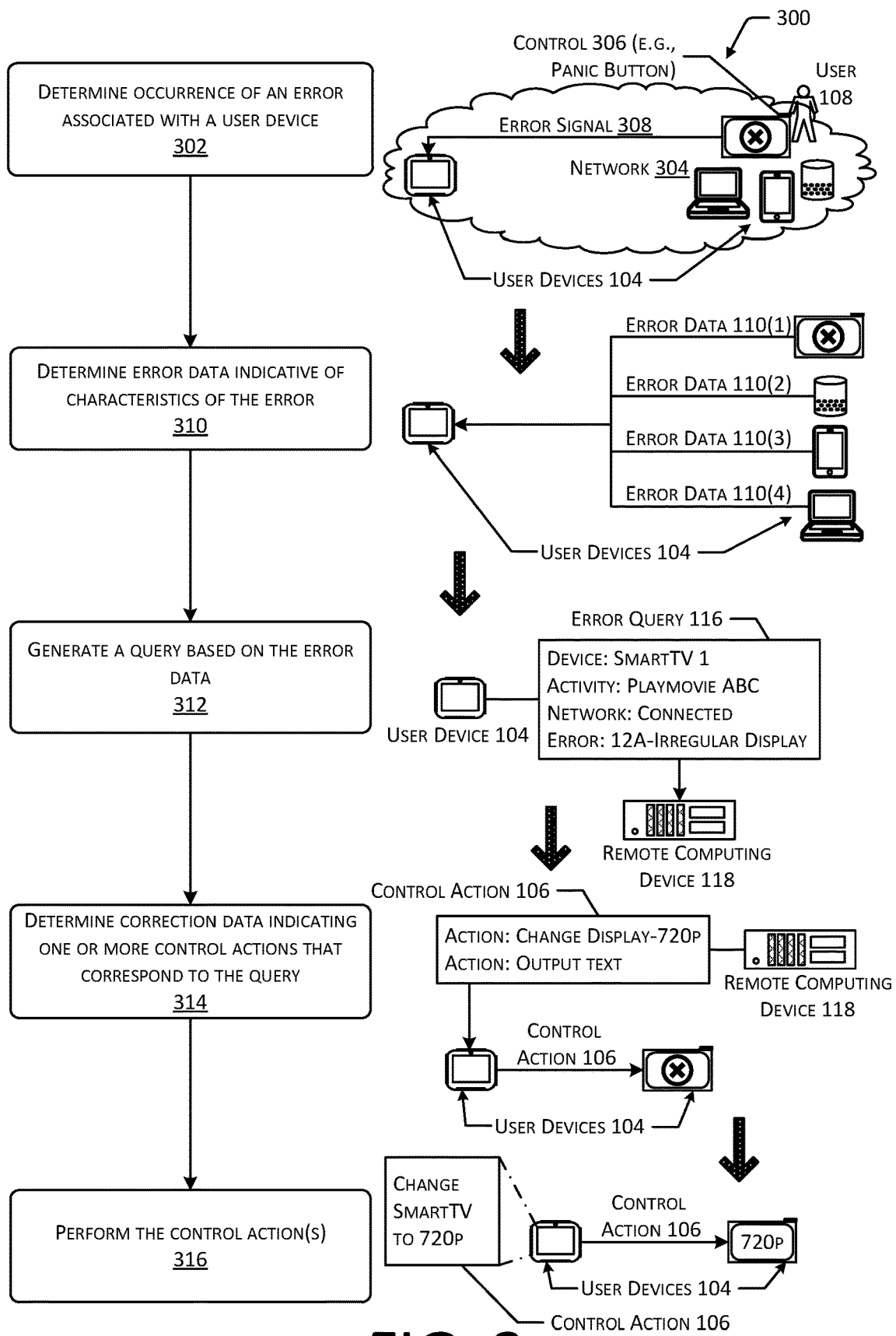
FIG. 3 depicts a scenario illustrating a method for determining a control action to perform responsive to an error.

FIG. 3 depicts a scenario 300 illustrating a method for determining a control action 106 to perform responsive to an error 102. At 302, occurrence of an error 102 associated with a user device 104 may be determined. For example, multiple user devices 104 may communicate using one or more networks 304, such as a LAN or wireless LAN. In other implementations, the user devices 104 may include one or more devices that are not in networked communication with other user devices 104, or that are in communication with only a subset of the other user devices 104. Occurrence of the error 102 associated with a particular user device 104 may be determined in a variety of ways. In one example, a user device 104 may include a control 306 associated therewith, such as a "panic button" or "troubleshooting button", that may be actuated by a user 108 if the user 108 determines that the user device 104 is affected by an error 102. For example, a user 108 may determine that the display output of a smart TV includes artifacts or other irregularities. Responsive to actuation of the control 306, the erroneous user device 104 may provide an error signal 308 indicative of the occurrence of the error 102 to one or more other user devices 104. In other implementations, a control 306 may be positioned on other user devices 104 or on a separate device, and the manner in which the control 306 is actuated may indicate a particular user device 104. For example, a control 306 may be configured such that three presses of a button indicates a smart TV in an environment, while five presses of the button indicates a coffee maker. In still other implementations, a user 108 may provide user input indicative of an error 102 and the affected user device 104 using a user interface presented on one or more user devices 104 in the environment. In some cases, the user device 104 affected by the error 102 may be configured to provide the error signal 308 independent of user input. For example, the user device 104 may be configured to provide at least a portion of an error log to one or more other user devices 104 upon occurrence of an error 102. In other implementations, occurrence of the error 102 may be determined by other user devices 104 that attempt to access the erroneous user device 104, such as when an attempt to access the user device 104 or perform a function requiring the user device 104 fails. In some cases, the absence of an expected signal from the erroneous user device 104 may indicate occurrence of the error 102. For example, the user device 104 affected by the error 102 may fail to respond to a signal received from another user device 104, or the user device 104 affected by the error 102 may fail to provide a periodic signal indicative of its status.

At 310, responsive to occurrence of the error 102, error data 110 indicative of characteristics of the error 102 may be determined by one or more of the user devices 104. For example, the user device 104 affected by the error 102 may provide error data 110(1) indicative of the status or activities of the user device 104, such as an error log, to one or more other user devices 104. Continuing the example, a smart TV may provide error data 110(1) to another device, such as a tablet computer, configured to generate error queries 116 and perform control functions on other user devices 104. An additional user device 104, such as one or more speakers of a sound system, may provide error data 110(2) to other user devices indicative of the status and activities of the additional user device 104 at or near the time of the error 102. For example, at the time that the error 102 occurred, the speaker(s) may have been outputting audio content to accompany video content that was output by the smart TV affected by the error 102. Other user devices 104 may provide error data 110(3) indicative of the status of the network 304, error data 110(4) indicative of the status or activities of the other user devices 104, and so forth. For example, error data 110 provided from a smartphone or laptop computer associated with the network 304 may indicate that these user devices 104 were able to access the internet using the network 304 at the time of the error 102. This information may indicate that the error 102 affecting the smart TV is not associated with the network 304 or its components. While FIG. 3 depicts multiple user devices 104 providing error data 110 to a single user device 104, in other implementations, error data 110 may be provided to multiple other user devices 104. Additionally, in some implementations, the user device 104 receiving error data 110 from other user devices 104 may also generate additional error data 110 indicative of the status or activities of the user device 104 and network 304.

At 312, one or more of the user devices 104 may generate a query based on the error data 110. For example, a user device 104 may generate an error query 116 indicative of the user device 104 affected by the error 102, the activities that were performed by the user device 104 at or near the time of the error 102, the status of the network 304 at or near the time of the error 102, and one or more error characteristics 210 associated with the error 102. Continuing the example, the error query 116 may include one or more device identifiers 202 indicative of a smart TV, an identifier of the content that the smart TV was outputting at the time of the error 102, and an indication that the smart TV was accessible on the network 304 at the time of the error 102. The error query 116 may also include error characteristics 210, such as an error code or description (e.g., "12A-Irregular Display"). In some implementations, the error query 116 may be provided to a remote computing device 118 configured to determine correspondence between the error query 116 and correction data 120. In other implementations, correction data 120 may be accessible to one or more of the user devices 104 and use of a remote computing device 118 may be omitted.

At 314, correction data 120 indicating a control action 106 that corresponds to the query may be determined. As described with regard to FIG. 2, correction data 120 may associate one or more control actions 106 with one or more sets of error data 110. For example, based on the device identifiers 202, device activities 206, error characteristics 210, and so forth indicated in the error query 116, the remote computing device 118, or in some implementations, one or more of the user devices 104, may interrogate a database or other data source containing the correction data 120. Based on correspondence between at least a portion of the correction data 120 with at least a portion of the error query 116, one or more control actions 106 may be determined. For example, control actions 106 associated with display irregularities for a smart TV may include changing a display configuration of the smart TV to 720p and outputting text to one or more of the user devices 104 indicating this modification to the configuration.

At 316, one or more of the user devices 104 may perform the control action(s) 106. For example, the control actions 106 may be provided to a computing device configured to provide control signals to other user devices 104. Continuing the example, FIG. 3 depicts a tablet computer changing a configuration of a smart TV based on a first control action 106, and outputting text indicative of the modification as a second control action 106. In some implementations, a control action 106 may include requesting user input, such as a confirmation, prior to modifying one or more user devices 104. In other implementations, a user 108 may be prompted to perform a control action 106 on a user device 104 that is not able to be controlled by other devices, such as a user device 104 not associated with the network 304 or a user device 104 that has been rendered non-functional by the error 102.

Figure 4:
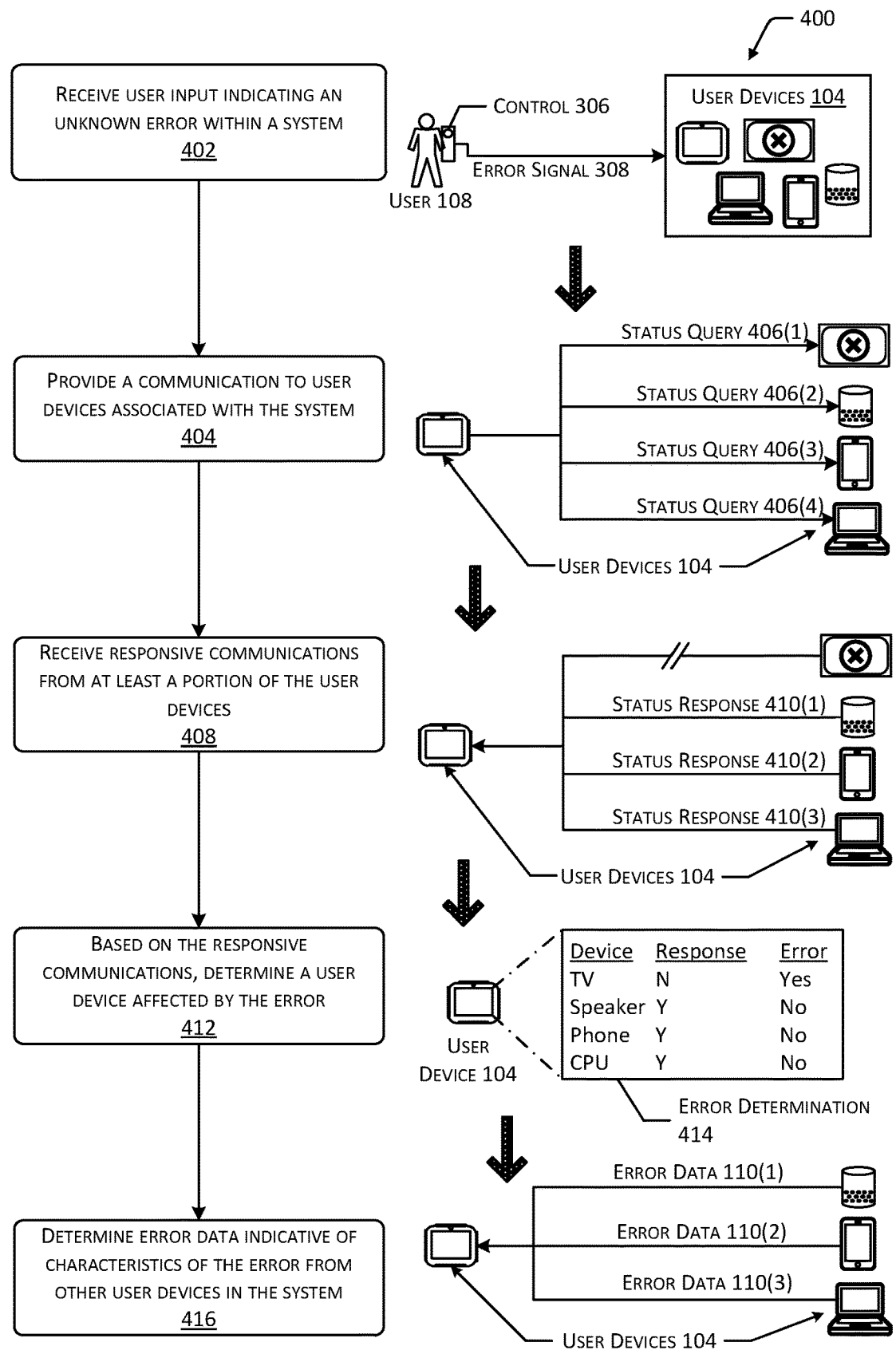
FIG. 4 depicts a scenario illustrating a method for determining a user device affected by an unknown error.

FIG. 4 depicts a scenario 400 illustrating a method for determining a user device 104 affected by an unknown error 102. For example, one or more user devices 104 within a system 100 may be affected by a potential error 102, perceived by a user 108. However, it may not necessarily be apparent which particular user device 104 is potentially affected by the error 102. Continuing the example, a smartphone or other computing device may be unable to access the internet using a wireless LAN connection. It may not be apparent whether this error 102 is associated with the smartphone itself, a wireless access point, a router, or other components of the system 100. In some cases, an error 102 may not be associated with one or more of the user devices 104 and may instead be associated with a remote device, such as a device associated with an internet service provider.

At 402, user input indicating an unknown error 102 within a system 100 may be received. For example, a user 108 may actuate a control 306 associated with one or more user devices 104 or with a separate control device. Continuing the example, the control 306 may include a button, such as a "panic button" or "troubleshooting button", which may be actuated when the user 108 perceives an irregularity regarding the function of one or more user devices 104 within the system 100. Actuation of the control 306 may provide an error signal 308 to one or more of the user devices 104. In some implementations, the error signal 308 may also be provided to one or more remote devices, such as a server associated with a user account, a technical support service, internet access, or one or more other services. FIG. 4 depicts five user devices 104, which include a smart TV affected by a potential error 102. However, other implementations may include any number and any type of user devices 104, and any one or multiple user devices 104 may be affected by one or multiple errors 102.

At 404, a communication may be provided to one or more user devices 104 associated with the system 100. For example, one or more of the user devices 104 may provide a status query 406 to one or more other user devices 104 to determine the status of the other user devices 104. In some implementations, the status query 406 may include a ping to determine whether communication with the other user devices 104 is possible. In other implementations, the status query 406 may include a request for particular data regarding the other user devices 104, an attempt to access particular functions of other user devices 104, and so forth. Continuing the example, FIG. 4 depicts a tablet computer providing a first status query 406(1) to a smart TV, a second status query 406(2) to a speaker, a third status query 406(3) to a smartphone, and a fourth status query 406(4) to a laptop computer.

At 408, one or more responsive communications may be received from at least a portion of the user devices 104. For example, one or more of the user devices 104 may provide a status response 410 to a user device 104 that previously provided a status query 406. The form and content of the status response 410 may depend on the data requested in the status query 406 and on the capabilities of the particular user device 104 providing the status response 410. FIG. 4 depicts a first status response 410(1) provided to the tablet computer from the speaker, a second status response 410(2), provided from the smartphone, and a third status response 410(3) provided from the laptop computer. FIG. 4 depicts a lack of a status response 410 from the smart TV, which may indicate that this particular user device 104 is unable to provide a status response 410 due to an error 102. In other implementations, the status responses 410 from a particular responding user device 104 may indicate that the responding user device 104 is affected by an error 102. In still other implementations, a response from a responding user device 104 may indicate that another user device 104 in communication with the responding user device 104 or detectable by the responding user device 104 is affected by an error 102.

At 412, a user device 104 affected by a potential error 102 may be determined based on the responsive communications. For example, a particular user device 104 that provided status queries 406 to other user devices 104 may be configured to generate an error determination 414 based on the status responses 410 received from the other user devices 104. FIG. 4 depicts the tablet computer generating an error determination 414 that indicates a possible error 102 associated with the smart TV based on the lack of a status response 410 from the smart TV.

At 416, error data 110 may be determined from other user devices 104 in the system 100, other than the user device(s) 104 affected by the error 102. The error data 110 may indicate whether the potential error 102 is an actual error 102 affecting the user device 104. The error data 110 may also indicate one or more characteristics of the error 102. For example, FIG. 4 depicts the speaker providing first error data 110(1) to the tablet computer, the smartphone providing second error data 110(2), and the laptop computer providing third error data 110(3). In some implementations, the user device(s) 104 affected by the error 102 may also provide error data 110, such as an error log, if the error 102 did not render the user device(s) 104 incapable of providing error data 110. Error data 110 may be used to determine characteristics of the error 102, the status and behaviors of various user devices 104, the status of the network 304, and so forth, at or near the time of the error 102. The error data 110 may also be used to determine possible control actions 106 that may be performed responsive to the error 102 to provide information to the user 108, to correct the error 102, to prevent subsequent errors 102, and so forth.

Figure 5:
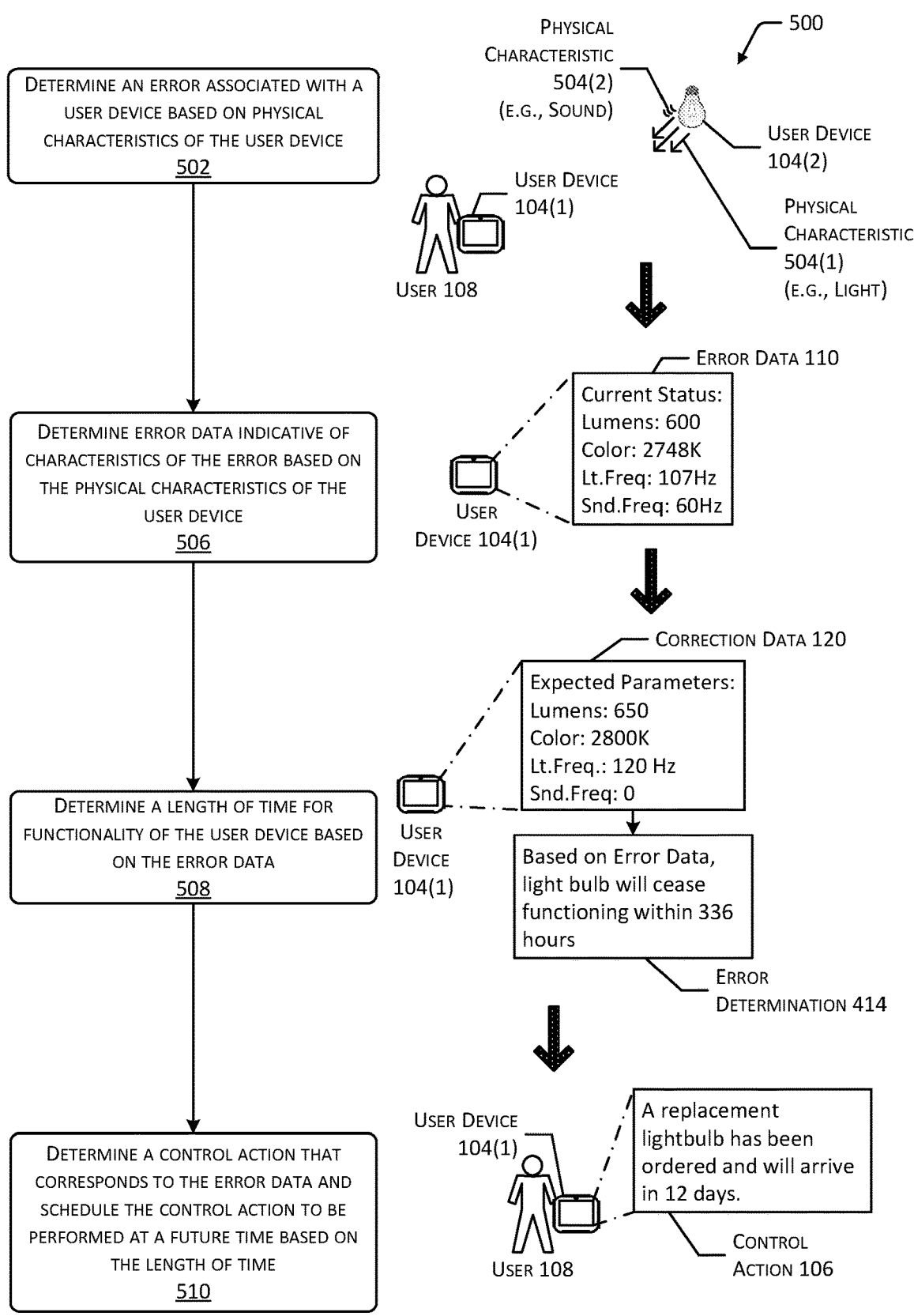
FIG. 5 depicts a scenario illustrating a method for determining errors and control actions based on visible or audible characteristics of a user device.

FIG. 5 depicts a scenario 500 illustrating a method for determining errors 120 and control actions 106 based on physical characteristics 504 of a user device 104, such as visible or audible characteristics, electromagnetic characteristics, thermal characteristics, and so forth. At 502, an error 102 associated with a user device 104(2) may be determined based on physical characteristics 504 of the user device 104(2). For example, in some cases, a user device 104(2) may not necessarily be in networked communication with other user devices 104. In other cases, a user device 104(2) may not be a computing device (e.g., may lack a processor or other computing components), and thus, may not be configured to generate data that may be determined by other computing devices. Continuing the example, possible user devices 104(2) that do not communicate with other user devices 104 via a network 304 may include light fixtures, air conditioners, refrigerators, washing machines, clothes dryers, coffee makers, and so forth. FIG. 5 depicts an example in which a first user device 104(1), such as a tablet computer, may determine an error 102 associated with a second user device 104(2), such as a light fixture, based on physical characteristics 504 of the light fixture. For example, the first user device 104(1) may include one or more image sensors, such as a camera. The second user device 104(2) may possess a first physical characteristic 504(1), such as the emission of visible light. In some cases, the second user device 104(2) may vibrate or move, crack, emit smoke, or produce other visible indicia of a possible error 102. The image sensor(s) of the first user device 104(1) may determine the intensity, color, and frequency of light emitted by the second user device 104(2), any movement or vibration of the second user device 104(2), or other visible characteristics. The first user device 104(1) may also include one or more audio sensors, such as a microphone. The second user device 104(2) may possess a second physical characteristic 504(2), such as the emission of an audible sound (e.g., a buzz or hum). The audio sensor(s) of the first user device 104(1) may determine the frequency and volume of a sound emitted by the second user device 104(2). Based on the physical characteristics 504 determined from a user device 104(2), the presence or absence of an error 102 may be determined. For example, if the intensity, color, or frequency of a light fixture deviates from expected normal values by more than a threshold amount, or if the light fixture is exhibiting movement or sound greater than a threshold amount, this may indicate an error 102 affecting the light source. As another example, a faulty switch used to control a light source may fail to complete a circuit when actuated. One or more electromagnetic sensors associated with the first user device 104(1) may detect the incomplete circuit. For example, when the switch is actuated, a magnetometer in the first user device 104(1) may detect no change in an ambient magnetic field that would be indicative of current flow, indicating that the actuation of the switch has not completed a circuit.

At 506, error data 110 indicative of the characteristics of the error 102 may be determined based on the physical characteristics 504 of the user device 104(2). For example, using one or more sensors, the first user device 104(1) may determine particular parameters of the physical characteristics 504 of the second user device 104(2). Continuing the example, FIG. 5 depicts the error data 110 including a current intensity of emitted light (e.g., "Lumens: 600"), a current color of the emitted light (e.g., "Color: 2748K"), and a current frequency of the emitted light (e.g., "Lt.Freq: 107 Hz"). The error data 110 is also depicted including a current frequency of an emitted sound (e.g., "Snd.Freq: 60 Hz"). In other implementations, the user device 104(2) may be configured to provide a physical signal indicative of at least a portion of the error data 110. For example, an emitted light pattern, acoustic signal, electromagnetic signal, and so forth may be used to identify characteristics of the user device 104(2). Continuing the example, a particular brand of light source may be configured to emit a particular electromagnetic or acoustic signal identifying the brand of the light source. As another example, a particular light source may be configured to emit a particular acoustic or electromagnetic signal indicative of a life expectancy or status of the light source, such as one or more predefined error conditions.

At 508, a length of time for functionality of the user device 104(2) may be determined based on the error data 110. For example, the first user device 104(1), or another computing device in communication therewith, may determine correspondence between the error data 110 and correction data 120. The correction data 120 may include an indication of expected parameters of the physical characteristics 504 as well as one or more control actions 106 that correspond to particular deviations from the expected parameters. In some implementations, the correction data 120 may include one or more rules or algorithms that determine the manner in which a length of time for functionality of the user device 104(2) is determined based on differences between the error data 110 and the correction data 120. For example, FIG. 5 depicts the correction data 120 including expected parameters for the intensity, color, and frequency of emitted light and the frequency of detected sound. Based on differences between the expected parameters of the correction data 120 and the physical characteristics 504 of the error data 110, the first user device 104(1) or other computing device in communication therewith, may generate an error determination 414 indicative of a length of time associated with functionality of the second user device 104(2). Continuing the example, the error determination 414 may indicate that based on the error data 110, the second user device 104(2) will cease functioning within 336 hours.

At 510, a control action 106 that corresponds to the error data 110 may be determined and scheduled to be performed at a future time based on the length of time associated with functionality of the user device 104(2). For example, a control action 106 may include scheduling replacement or maintenance of a part, installation or upgrading of software, or other maintenance or replacement actions at a future time, at or near a time when functionality of a user device 104 may cease or diminish. Continuing the example, a control action 106 for a light fixture that is expected to fail within 336 hours may include ordering a replacement light fixture and scheduling delivery of that light fixture at a time prior to the passage of 336 hours. In some implementations, the control action 106 may include outputting a recommendation of a future maintenance or replacement action and scheduling the future action responsive to user input. In other implementations, the future action may be scheduled automatically, and the control action 106 may include outputting text informing a user 108 of the future action.

Figure 6:
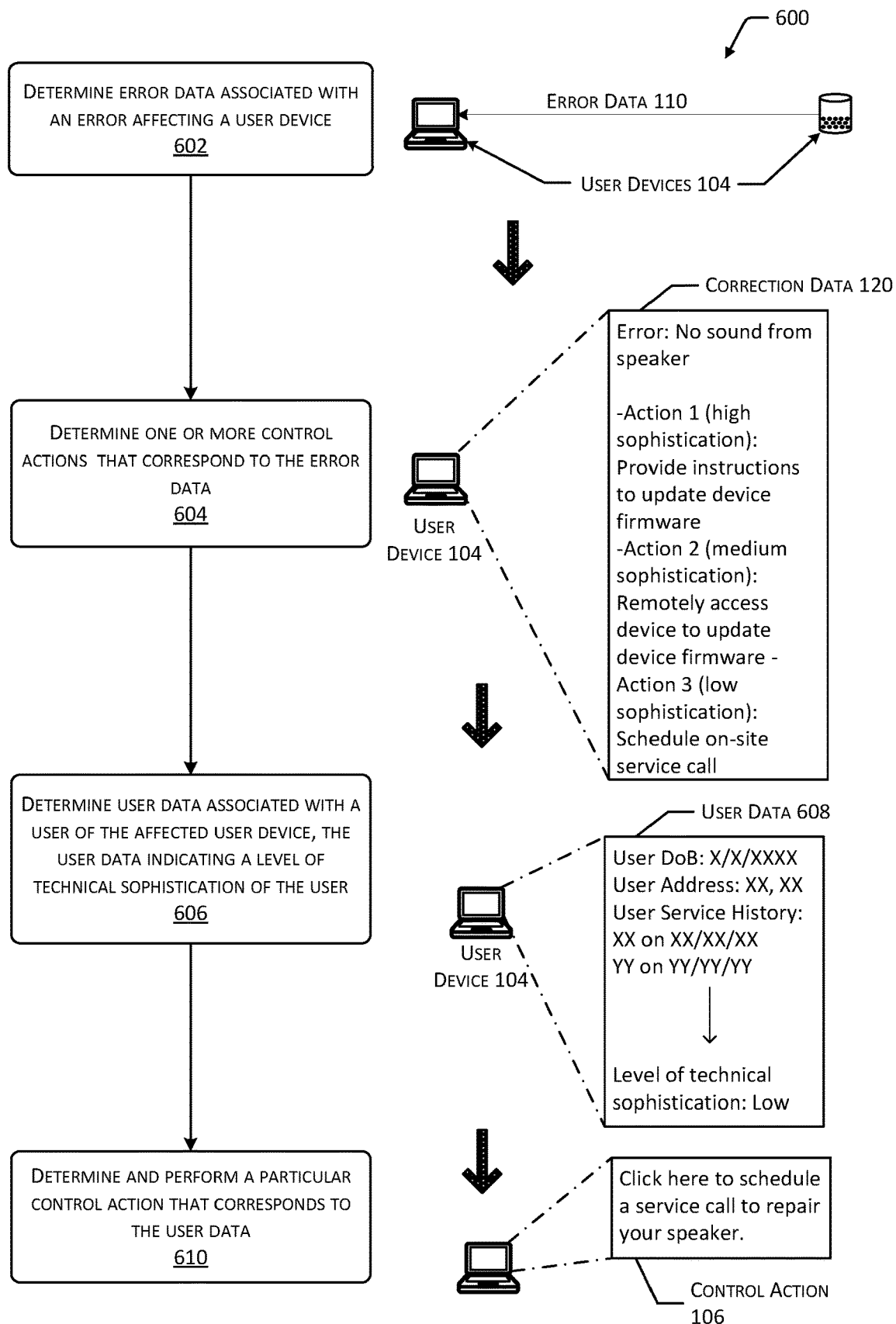
FIG. 6 depicts a scenario illustrating a method for determining a particular control action based on data indicative of the technical sophistication of a user.

FIG. 6 depicts a scenario 600 illustrating a method for determining a particular control action 106 based on data indicative of the technical sophistication of a user 108. At 602, error data 110 associated with an error 102 affecting a user device 104 may be determined. As described with regard to FIGS. 1-5, occurrence of an error 102 may be determined based on user input, an action of a user device 104 affected by an error 102, or an action of another user device 104 that causes the error 102 of the affected user device 102 to become apparent. For example, a user 108 may determine that a wireless speaker is not emitting sound and may actuate a control 306 indicating the error 102. One or more other user devices 104 may determine error data 110 associated with the speaker subsequent to actuation of the control 306. The error data 110 determined responsive to occurrence of the error 102 may indicate one or more characteristics of the error 102, which may be used to determine suitable control actions 106 to be taken subsequent to the error 102.

At 604, one or more control actions 106 that correspond to the error data 110 may be determined. For example, a user device 104 or another computing device in communication therewith may determine correspondence between the determined error data 110 and correction data 120 that associates possible control actions 106 with various characteristics of errors 102. Continuing the example, FIG. 6 depicts correction data 120 indicating three possible control actions 106 that may be performed based on the error data 110. The correction data 120 may also include a level of technical sophistication associated with one or more of the control actions 106. A first example control action 106 may include providing instructions to a user 108 to update the firmware of a user device 104. This action may be associated with a level indicating "high sophistication". A second example control action 106 may include providing instructions to a user 108 to enable a technician to remotely access one or more user devices 104 to update the firmware of the affected user device 104. This action may be associated with a level indicating "medium sophistication". A third example control action 106 may include scheduling an on-site service call with a technician, which may be associated with a level indicating "low sophistication".

At 606, user data 608 associated with a user 108 of the affected user device 104 may be determined. The user data 608 may indicate a level of technical sophistication of the user 108. For example, user data 608 may include a geolocation (e.g., address) of the user 108, a birthdate of the user 108, a service history of the user 108, and so forth. Continuing the example, a user 108 having a service history that has included a large quantity of requests for technical support may indicate that the user 108 possesses a low level of technical sophistication.

At 610, a particular control action 106 that corresponds to the user data 608 may be determined and performed. For example, based on a determination that the user 108 possesses a "low" level of technical sophistication, the control action 106 that is performed may generate a user interface that may be used to schedule an on-site service call to repair the erroneous user device 104. In cases where a user 108 is determined to have a higher level of technical sophistication, other control actions 106 may include instructing a user 108 to reset a user device, replace a part, install or upgrade software, modify one or more configurations to enable a third party to remotely access a user device 104, and so forth.

In some implementations, additional user data 608 may be generated based on the control action 106. For example, user data 608 may include a history of previous control actions 106 associated with devices 104 owned by a user 108. If a user 108 succeeded or failed to successfully perform particular control actions 106, this may indicate a level of technical sophistication associated with the user 108. The successful or unsuccessful performance of subsequent control actions 106 may be used to modify the level of technical sophistication, which may affect future control actions 106 recommended to the user 108. In some implementations, a control action 106 may be used to determine additional error data 110 associated with the error 102. For example, a control action 106 may include scheduling a service appointment with a technician. While present, the technician may determine additional error data 110, such as the strength of a wireless signal in various portions of a structure, configurations of various devices 104, and so forth.

Figure 7:
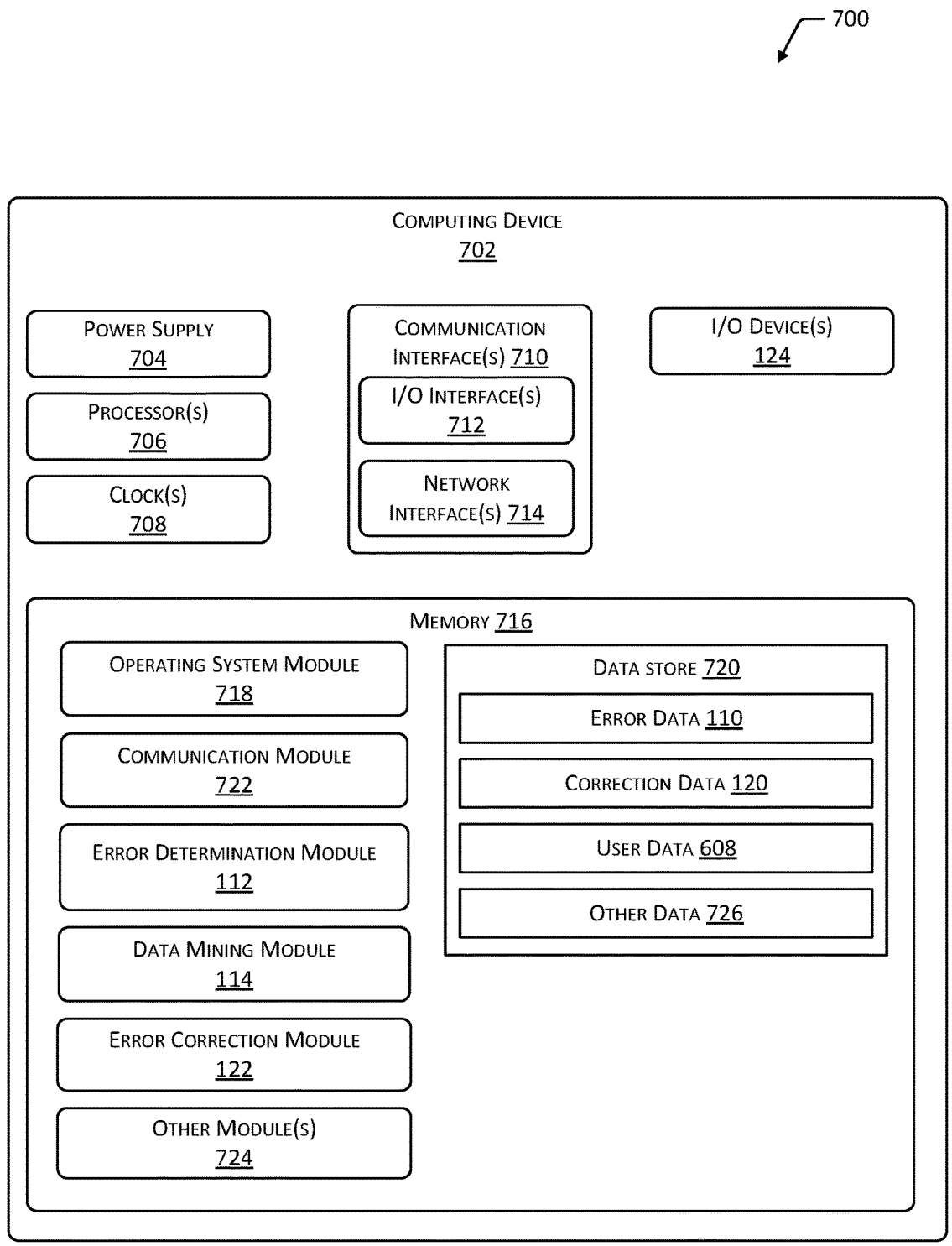
FIG. 7 is a block diagram depicting a computing device within the scope of the present disclosure.

FIG. 7 is a block diagram 700 depicting a computing device 702 within the scope of the present disclosure. The computing device 702 may include one or more user devices 104, remote computing devices 118, or any other separate computing device 702 in communication with the user device(s) 104 or remote computing device(s) 118. For example, some implementations within the scope of the present disclosure may include one or more separate computing devices 702 that receive and analyze error data 110 and determine control actions 106. However, in other implementations, one or multiple user devices 104 may perform one or more of the functions described herein. As such, the depicted computing device 702 may include one or multiple computing devices 702 of any type, including, without limitation, mobile devices, set-top boxes, tablet computers, personal computers, wearable computers, servers, and so forth.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components thereof. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 124. The I/O devices 124 may include any manner of input device or output device associated with the computing device 702 or with another computing device 702 in communication therewith. For example, I/O devices 124 may include touch sensors, keyboards, mouse devices, microphones, image sensors (e.g., cameras), scanners, displays, speakers, haptic devices, printers, and so forth. I/O devices 124 may also include one or more controls 306 that may be used to generate error signals 308 indicative of errors 102 associated with particular devices. In some implementations, actuation of a control 306 may be used to indicate an error 102 affecting an unknown device. In some implementations, the I/O devices 124 may be physically incorporated with a computing device 702 or may be externally placed.

The network interfaces 714 may be configured to provide communications between the computing device 702 and other devices, such as the I/O devices 124, routers, access points, and so forth. The network interfaces 714 may include devices configured to couple to one or more networks including local area networks (LANs), wireless LANs, wide area networks (WANs), wireless WANs, and so forth. For example, the network interfaces 1014 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 716. The memory 716 may include one or more computer-readable storage media (CRSM). The CRSM may be any one or more of an electronic storage medium, a magnetic storage medium, an optical storage medium, a quantum storage medium, a mechanical computer storage medium, and so forth. The memory 716 may provide storage of computer-readable instructions, data structures, program modules, and other data for the operation of the computing device 702. A few example modules are shown stored in the memory 716, although the same functionality may alternatively be implemented in hardware, firmware, or as a system on a chip (SoC).

The memory 716 may include one or more operating system (OS) modules 718. The OS module 718 may be configured to manage hardware resource devices such as the I/O interfaces 712, the network interfaces 714, the I/O devices 124, and to provide various services to applications or modules executing on the processors 706. The OS module 718 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 720 and one or more of the following modules may also be stored in the memory 716. The modules may be executed as foreground applications, background tasks, daemons, and so forth. The data store 720 may use a flat file, database, linked list, tree, executable code, script, or other data structure to store information. In some implementations, the data store 720 or a portion of the data store 720 may be distributed across one or more other devices including other computing devices 702, network attached storage devices, and so forth.

A communication module 722 may be configured to establish communications with user devices 104, remote computing devices 118, or one or more other computing devices 702. The communications may be authenticated, encrypted, and so forth.

The memory 716 may also store the error determination module 112. The error determination module 122 may determine occurrence of an error 102 associated with one or more user devices 104. For example, the error determination module 112 may receive user input indicative of an error 102 or a signal from a user device 104 indicating an error 102 affecting the user device 104 providing the signal or another user device 104. In some implementations, the error determination module 112 may be configured to determine occurrence of an error 102 based on the status or activity of one or more user devices 104 or one or more networks 304. For example, upon a failed attempt to access a particular user device 104 or cause the user device 104 to perform a particular function, an error 102 associated with the user device 104 may be determined.

The error determination module 112 may also determine error data 110 associated with the error 102 from one or more user devices 104. In some cases, the error determination module 112 may generate error data 110 indicative of the status and activities of the computing device 702 at or near the time of the error 102. In other implementations, error data 110 may be requested or received from other user devices 104, which in some cases may include the user device 104 affected by the error 102.

The memory may additionally store the data mining module 114. The data mining module 114 may generate an error query 116 based on at least a portion of the error data 110. The error query 116 may be configured to interrogate a database or other source of correction data 120 to determine control actions 106 that correspond to the error data 110. In some implementations, the data mining module 114 may provide the error query 116 to a remote computing device 118. In other implementations, the computing device 702 or another user device 104 in communication therewith may store the correction data 120, and the error query 116 may be used to determine control actions from the non-remote source of the correction data 120. The correction data 120 may associate particular control actions 106 with corresponding sets of error characteristics. Correspondence between the error data 110 included in the error query 116 and the correction data 120 may indicate particular control actions 106 that may be performed subsequent to an error 102.

The memory 716 may further store the error correction module 122. The error correction module 122 may cause one or more control actions 106 to be performed. In some implementations, a control action 106 may include providing a user interface to a user 108 and receiving user input selecting or confirming a particular control action 106 to be performed. In other implementations, a control action 106 may include outputting alphanumeric data, audio data, image data, or another type of data recommending a particular course of action to a user 108 to remedy an error 102 or avoid subsequent errors 102. In still other implementations, a control action 106 may include one or more automated actions performed independent of user input, such as modifying a configuration or setting of a user device 104, resetting a user device 104, modifying an application or other software associated with a user device 104, and so forth. In some cases, a control action 106 may include a scheduled future action, such as ordering a replacement part based on a length of time after which a current part may become non-functional, scheduling a service call with a technician, upgrading an application or other software, and so forth.

Other modules 724 may also be present in the memory 716. For example, encryption modules may be used to encrypt and decrypt communications between computing devices 702. The other modules 724 may also include modules for logging errors 102, control actions 106, user service histories, and so forth. Other modules 724 may further include user input modules configured to provide user interfaces and receive user input responsive thereto. For example, user input modules may be used to determine user input indicative of errors 102, error data 110, and so forth.

Other data 726 within the data store 720 may include user input data, such as configurations and settings associated with computing devices 702. For example, configuration data may be used to determine whether one or more configurations of a particular user device 104 may cause or prevent particular errors 102. Other data 726 may also include security data, such as encryption keys and schema, access credentials, and so forth.

In different implementations, different computing devices 702 may have different capabilities or capacities. For example, servers may have significantly more processor 706 capability and memory 716 capacity compared to the processor 706 capability and memory 716 capacity of personal user devices 104, such as smartphones or tablet computers.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
 a plurality of computing devices including at least a first computing device and a second computing device, wherein the first computing device and the second computing device are in communication via a network;
 one or more memories storing computer-executable instructions; and
 one or more hardware processors of the first computing device, to execute the computer-executable instructions to:
  provide a request, from the first computing device to the second computing device, wherein the request causes the second computing device to perform a function;
  determine, by the first computing device, a failure of the second computing device to perform the function;
  determine, by the first computing device, based at least in part on the failure, an indication of an error associated with the second computing device;
  responsive to the indication of the error, determine, by the first computing device, error data indicative of one or more characteristics of the error;
  determine, by the first computing device, user data associated with the second computing device based on a correspondence between the error data and one or more control actions performed based on the error data;
  determine, based on one or more of the user data or the error data, a metric indicative of a quantity of prior requests for technical support;
  generate a query, by the first computing device, the query including at least a subset of the one or more characteristics of the error based on the metric;
  provide the query to a third computing device that interrogates a database to determine correction data that corresponds to the at least a subset of the one or more characteristics of the error;
  in response to the query, receive, at the first computing device from the third computing device, the correction data that corresponds to the at least a subset of the one or more characteristics of the error, the correction data indicating a control action to address the error; and
  automatically perform the control action to address the error associated with the second computing device.

2. The system of claim 1, further comprising:
 one or more sensors to determine one or more of a visible characteristic or an audible characteristic of the second computing device; and
 the computer-executable instructions to determine the error based at least in part on the one or more of the visible characteristic or the audible characteristic associated with the second computing device.

3. The system of claim 1, wherein the correction data includes an indication of one or more configurations associated with one or more functions of the second computing device, the system further comprising computer-executable instructions to:
 determine correspondence between configuration data associated with the second computing device and the correction data; and
 wherein the control action includes one or more of: modifying at least one configuration of the second computing device, generating a notification indicative of the at least one configuration, or generating an indication of at least one maintenance action to be performed at a future time.

4. A method comprising:
 providing a request from a first device to a second device, wherein the request causes the second device to perform a function;
 determining, by the first device, a failure of the second device to perform the function;
 determining, by the first device, one or more of a visible attribute or an audible attribute of the second device using at least one sensor associated with the first device;
 based at least in part on the failure and the one or more of the visible attribute or the audible attribute, determining, by the first device, an error associated with the second device;
 responsive to the determining of the error, determining error data, by the first device, indicative of one or more characteristics of the error, based at least in part on one or more interactions between the first device and the second device;
 determining a metric indicative of a quantity of prior requests for technical support;
 generating a query based on the metric using the first device, the query including at least a subset of the one or more characteristics of the error;

providing the query to one or more data sources to determine correction data that corresponds to the at least a subset of the one or more characteristics of the error;

receiving, from the one or more data sources, the correction data that corresponds to the at least a subset of the one or more characteristics of the error, the correction data indicating a control action to address the error; and performing the control action associated with the correction data to address the error associated with the failure of the second device to perform the function.

5. The method of claim 4, further comprising:
determining second error data based on the performing the control action;
determining a second control action based at least in part on the second error data; and
performing the second control action.

6. The method of claim 4, further comprising:
determining user input provided to one or more of the first device, the second device, or a third device, the user input indicating occurrence of an unknown error;
attempting to provide a signal to at least the second device; and
determining occurrence of the error associated with the second device based on one or more of a response to the signal, a failure to provide the signal, or a lapse of a threshold length of time without receiving a communication from the second device.

7. The method of claim 4, further comprising:
determining one or more of an electromagnetic characteristic, a thermal characteristic, or movement of the second device using the at least one sensor associated with one or more of the first device or a third device in communication with the first device; and
wherein occurrence of the error associated with the second device is determined based at least in part on the one or more of the electromagnetic characteristic, the thermal characteristic, or the movement.

8. The method of claim 4, further comprising:
providing a request for the error data to the second device; and
receiving the error data from the second device, at least a portion of the error data including an error log generated by the second device.

9. The method of claim 4, further comprising:
determining configuration data associated with the second device; and
determining correspondence between the configuration data and the error data, the correspondence indicating an association between the error and one or more configurations of one or more of at least one part or at least one function of the second device;
wherein the control action includes one or more of: modifying at least a subset of the one or more configurations or generating output indicating the at least a subset of the one or more configurations.

10. The method of claim 4, further comprising:
determining configuration data associated with the second device;
determining, based on the configuration data and the error data, a length of time associated with functionality of the second device; and
wherein the control action includes generation of a maintenance action to be performed at a future time based on the length of time.

11. The method of claim 4, further comprising:
determining actuation of a control associated with at least one of the first device, the second device, or a third device;
providing a signal to at least one of the first device, the second device, or the third device; and
wherein at least a portion of the error data is determined to be based at least in part on one or more responses received from the at least one of the first device, the second device, or the third device.

12. The method of claim 4, further comprising:
determining user data associated with the second device, wherein the user data indicates one or more characteristics of an owner of the second device, wherein the one or more characteristics include one or more of a history of control actions or an attribute associated with the owner;
determining correspondence between the user data and control action data, wherein the control action data associates characteristics of owners with respective control actions; and
determining, based on the correspondence, a particular control action that corresponds to the one or more characteristics of the owner of the second device.

13. A system comprising:
one or more memories storing computer-executable instructions;
one or more sensors; and
one or more hardware processors of a first device, to execute the computer-executable instructions to:
provide a request to a second device to cause the second device to perform a function;
determine a failure of the second device to perform the function;
based at least in part on the failure of the second device, automatically determine, by the first device, error data indicative of one or more characteristics of an error associated with the failure of the second device;
determine a correspondence between the error data and one or more control actions performed on the second device based on the error data;
determine a metric indicative of a quantity of prior requests for technical support;
generate a query based on the metric, the query including at least a subset of the one or more characteristics of the error;
provide the query to a third device that interrogates a database to determine correction data that corresponds to the at least a subset of the one or more characteristics of the error;
receive, from the third device, the correction data that corresponds to the at least a subset of the one or more characteristics of the error, the correction data indicating a control action to address the error; and
perform the control action associated with the correction data to address the error associated with the failure of the second device to perform the function.

14. The system of claim 13, wherein the second device includes a headless device lacking one or more of a display output device or an audio output device, the system further comprising computer-executable instructions to:
generate output including generating the error data by the first device, generating the correction data by the third device, and generating the control action by the first device to provide to the second device.

15. The system of claim 13, wherein the second device is incapable of networked communication with the first device, the system further comprising computer-executable instructions to:

determine at least a portion of the error data using the one or more sensors to determine an electromagnetic characteristic, a thermal characteristic, or movement of the second device.

16. The system of claim 13, further comprising computer-executable instructions to:

determine configuration data associated with the second device, the configuration data indicating one or more configurations of one or more of at least one part or at least one function of the second device; and determine correspondence between the configuration data and the correction data, the correspondence indicating one or more configurations of the second device associated with the error;

wherein the control action includes one or more of: modifying at least a subset of the one or more configurations or generating a notification indicative of the at least a subset of the one or more configurations.

17. The system of claim 13, further comprising computer-executable instructions to:

determine configuration data associated with the second device, the configuration data indicating one or more configurations associated with performance of one or more functions of the second device;

determine, based on the configuration data and the error data, a length of time associated with the function of the second device; and determine, based on the length of time, a future time for performance of the control action.

18. The system of claim 13, further comprising computer-executable instructions to:

determine first user data associated with the second device, the first user data indicating one or more characteristics of a user of the second device, wherein the one or more characteristics include one or more of a history of control actions or an attribute associated with the user; and determine correspondence between the first user data and control action data associating the control action with the one or more characteristics of the user;

wherein the control action is determined based at least in part on the correspondence between the first user data and the control action data.

19. The system of claim 18, further comprising computer-executable instructions to:

determine second user data associated with successful or unsuccessful performance of the control action; and determine an attribute of the user based on the first user data and the second user data.

20. The system of claim 13, further comprising computer-executable instructions to:

determine actuation of a control associated with at least one device of a plurality of devices, the plurality of devices including the first device and the second device;

provide a signal to at least a subset of the plurality of devices including the at least one device; and determine at least a portion of the error data based at least in part on one or more responses received from the at least a subset of the plurality of devices.

\* \* \* \* \*